US 9,163,554 B2

(12) United States Patent
Ino

(10) Patent No.: US 9,163,554 B2
(45) Date of Patent: Oct. 20, 2015

(54) AIR INTAKE APPARATUS FOR INTERNAL COMBUSTION ENGINE

(71) Applicant: DENSO CORPORATION, Kariya, Aichi-pref. (JP)

(72) Inventor: Masao Ino, Toyota (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/305,234

(22) Filed: Jun. 16, 2014

(65) Prior Publication Data

US 2015/0027114 A1 Jan. 29, 2015

(30) Foreign Application Priority Data

Jul. 26, 2013 (JP) .................. 2013-155192

(51) Int. Cl.
| | |
|---|---|
| *F02B 23/04* | (2006.01) |
| *F02B 29/04* | (2006.01) |
| *F02M 35/10* | (2006.01) |
| *F02M 25/07* | (2006.01) |
| *F02M 35/08* | (2006.01) |

(52) U.S. Cl.
CPC ......... *F02B 29/0418* (2013.01); *F02B 29/0437* (2013.01); *F02B 29/0468* (2013.01); *F02B 29/0475* (2013.01); *F02M 25/0709* (2013.01); *F02M 35/088* (2013.01); *F02M 35/10268* (2013.01)

(58) Field of Classification Search
CPC .. F02B 29/04; F02B 29/0418; F02B 29/0468; F02B 29/0493; F02M 25/0712
See application file for complete search history.

(56) References Cited

U.S. PATENT DOCUMENTS

| | | | |
|---|---|---|---|
| 6,868,840 B2 | 3/2005 | Lewallen | |
| 7,131,263 B1 * | 11/2006 | Styles | ............................. 60/278 |
| 7,661,415 B2 | 2/2010 | Nakamura | |
| 8,132,407 B2 | 3/2012 | Li | |
| 2003/0234009 A1 * | 12/2003 | Kennedy et al. | .......... 123/568.12 |
| 2005/0056263 A1 * | 3/2005 | Kennedy | .................. 123/568.12 |
| 2007/0017489 A1 * | 1/2007 | Kuroki et al. | ............ 123/568.12 |
| 2007/0199319 A1 * | 8/2007 | Bender | ........................... 60/599 |
| 2008/0022676 A1 * | 1/2008 | Cook et al. | ...................... 60/599 |
| 2009/0014161 A1 * | 1/2009 | Mihajlovic | ..................... 165/148 |
| 2010/0263637 A1 * | 10/2010 | Muller et al. | .................. 123/556 |
| 2011/0225959 A1 * | 9/2011 | Sailer et al. | ..................... 60/309 |
| 2012/0138025 A1 * | 6/2012 | Yoon | ............................. 123/563 |
| 2013/0000611 A1 * | 1/2013 | Vigild et al. | ................... 123/542 |
| 2013/0000612 A1 * | 1/2013 | Vigild et al. | ................... 123/563 |

FOREIGN PATENT DOCUMENTS

| | | |
|---|---|---|
| DE | 102008047079 A1 | 3/2010 |
| DE | 102010033125 A1 | 2/2012 |

(Continued)

*Primary Examiner* — Jesse Bogue

(57) ABSTRACT

A case is connected between an outlet side of a turbocharger and an intake port of an engine. A cooling passage and a bypass passage are partitioned in the case to split intake air into two flows. A storage unit is formed in a bottom portion of the case to accumulate liquid. The cooling passage is located along a gravity direction to flow intake air from a lower side to an upper side. The bypass passage flows intake air to bypass the cooling passage. A valve controls opening of the cooling passage and the bypass passage on an inlet side or on an outlet side. The valve opens the bypass passage to forcedly supply at least a part of intake air, which is drawn into the case, through the storage unit and the bypass passage into the intake port.

8 Claims, 4 Drawing Sheets

(56) References Cited

FOREIGN PATENT DOCUMENTS

| EP | 1336736 | A2 | 8/2003 |
|---|---|---|---|
| JP | 2010-510424 | A | 4/2010 |
| JP | 2010-510425 | A | 4/2010 |
| JP | 2012219735 | A | 11/2012 |
| WO | 2008061693 | A1 | 5/2008 |
| WO | 2008061694 | A1 | 5/2008 |

* cited by examiner

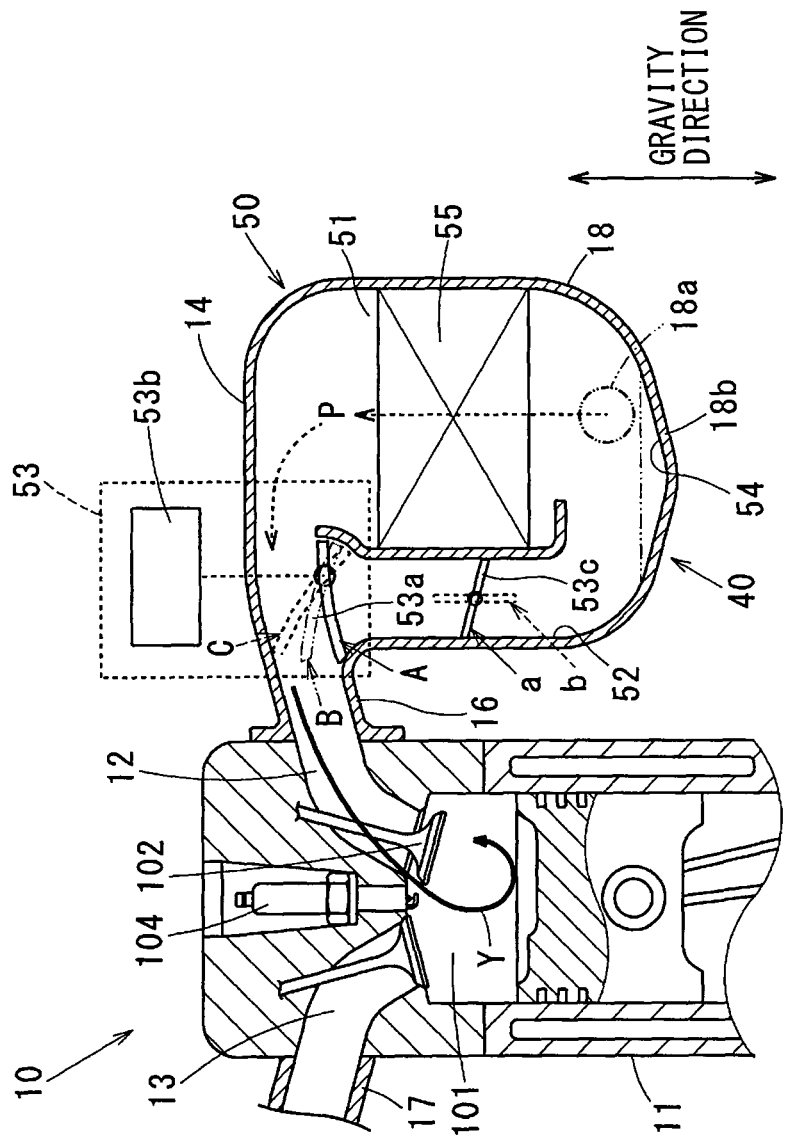

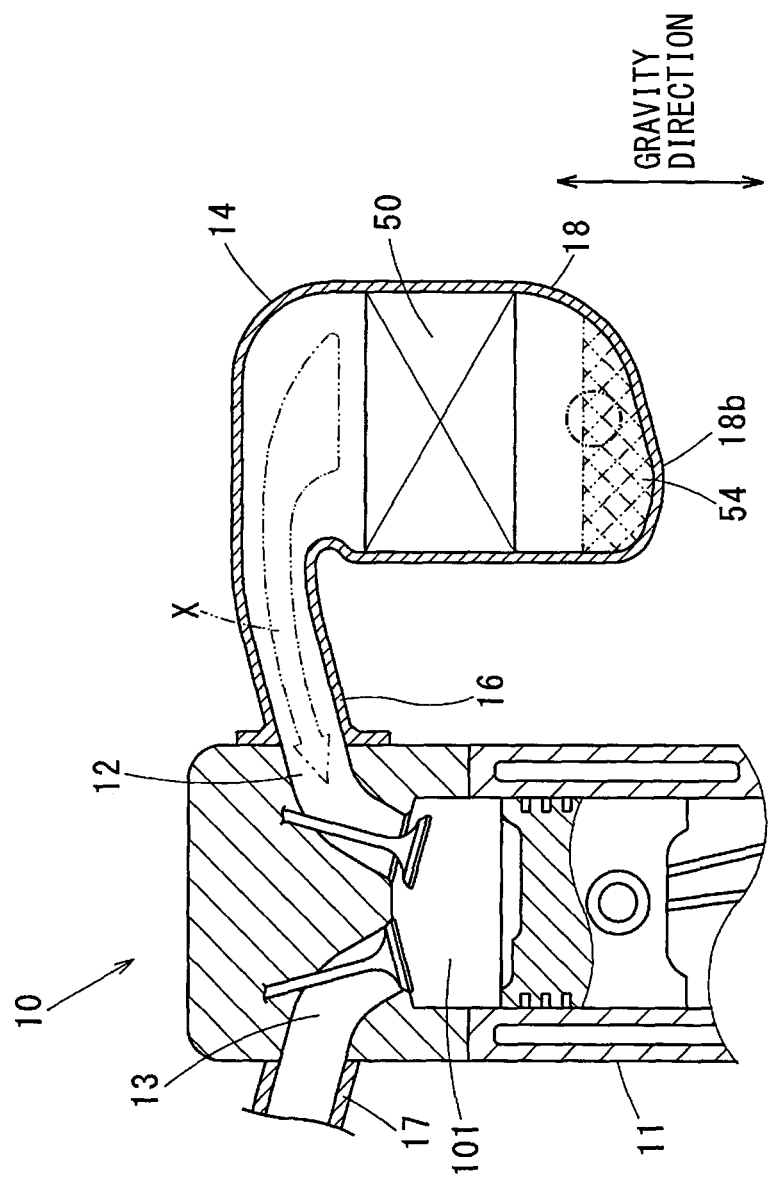

AIR INTAKE APPARATUS FOR INTERNAL COMBUSTION ENGINE

CROSS REFERENCE TO RELATED APPLICATION

This application is based on reference Japanese Patent Application No. 2013-155192 filed on Jul. 26, 2013, the disclosure of which is incorporated herein by reference.

TECHNICAL FIELD

The present disclosure relates to an air intake apparatus for an internal combustion engine equipped to a vehicle such as an automobile. The present disclosure may relate to, for example, an air intake apparatus to cool intake air, which is supercharged with a turbocharger, with an intercooler and to distribute the cooled intake air into multiple intake ports of the engine.

BACKGROUND

Conventionally, a supercharger type engine includes a supercharger system to supercharge intake air drawn into the engine.

In a supercharger type engine, a turbocharger compresses intake air, and consequently, the compressed intake air increases in temperature. As it is, a charging efficiency of the compressed intake air may decrease, and the compressed intake air may cause knocking when the engine is, for example, at high load. In consideration of this, compressed intake air may be generally cooled. Various configurations may be proposed to cool compressed intake air. For example, an intercooler may be equipped between a turbocharger and multiple intake ports to cool intake air, which is compressed in the turbocharger and is at high temperature. Thereafter, the intake air cooled with the intercooler may be distributed into multiple intake ports.

Various air intake apparatuses may be proposed to comply with a regulation related to exhaust gas and/or to reduce fuel consumption. For example, an EGR system may be employed to draw a part of exhaust gas as EGR gas into either or both of an inlet of a turbocharger at a low-pressure side and an outlet of the turbocharger at a high-pressure side. In this case, an EGR cooler may be equipped to an EGR-gas inlet passage to cool EGR gas.

SUMMARY

It is an object of the present disclosure to produce an air intake apparatus configured to cool supercharged intake air appropriately.

In general, EGR gas is at high temperature. Therefore, even in a configuration where, an EGR cooler is equipped to an EGR-gas inlet passage to cool EGR gas, the EGR cooler may not be sufficient to cool EGR gas. Therefore, an intercooler for cooling supercharged intake air may be equipped to cool supercharged intake air.

Herein, in a configuration, where an intercooler for cooling supercharged intake air and an EGR cooler for cooling EGR gas are equipped individually, the entire air intake apparatus may be enlarged. Therefore, in consideration of that a space around an engine is increasingly reduced, an intercooler for cooling supercharged intake air may be used also as an EGR cooler.

In the above-described air intake apparatus, the intercooler for cooling supercharged intake air may cause a large amount of liquid, such as condensate and drawn oil.

For example, when an engine is operated at low load and at low rotation speed under a low water temperature environment, condensate may occur by an amount enough to cause misfire. Therefore, in the is case, an amount of EGR needs to be reduced. As a result, reduction in fuel consumption effect may be impaired.

For example, as shown in FIG. 4, assuming a state where a large amount of liquid, such as condensate, may accumulate in the bottom portion 18b (storage unit 54) of the surge tank 18 of the intercooler 50. In this case, in a case where an amount of intake air increases rapidly due to acceleration of the vehicle, as shown by an arrow X, the accumulating liquid may flow from the intake port 12 into the combustion chamber 101 together with intake air. Consequently, relatively serious phenomena such as water hammer may be concerned.

Herein, Patent Documents 1 and 2 may propose an arrangement of an intercooler not to accumulate liquid, such as condensate, in the intercooler.

Specifically, an intercooler is equipped in the intake air manifold laterally. That is, the intercooler is equipped perpendicular to the gravity direction. In this way, the cooling passage is directed along the direction of an intake port, thereby to enable liquid, such as condensate, caused in or drawn into the intercooler to be drawn smoothly in the engine.

It is noted that, in the configuration where the intercooler is equipped laterally, the intercooler needs to be located on a plane, which is perpendicular to a head flange. The head flange is a mounting member of an intake air manifold. In general, it is hard to secure in a vehicle a sufficient space, which is on the plane perpendicular to the head flange. Therefore, it is hard to secure a sufficient space for the intercooler having a large capacity. Consequently, it is hard to secure both a cooling performance and a mountability.

Therefore, it may be desirable to address occurring liquid in a configuration where the intercooler is equipped vertically as exemplified in FIG. 4. In the vertical equipment, the cooling passage is located along the gravity direction, and accommodation space for the intercooler is less regulated.

(Patent Document 1)
Publication of International Application No. 2010-510424
(Patent Document 2)
Publication of International Application No. 2010-510425

According to an aspect of the present disclosure, an air intake apparatus is configured to receive intake air, which is supercharged with a turbocharger, and to distribute the intake air into a plurality of intake ports of an internal combustion engine. The air intake apparatus comprises an intercooler configured to cool intake air supercharged with the turbocharger. The intercooler includes a case and a valve unit. The case is connected between an outlet of the turbocharger and the intake ports. The case has a cooling passage and a bypass passage, which are partitioned from each other and configured to split intake air into two flows. The cooling passage is located along a gravity direction and configured to flow intake air from a lower side to an upper side. The bypass passage is configured to cause intake air to bypass the cooling passage. The case has a bottom portion forming a storage unit configured to accumulate liquid occurring in or drawn into the case. The valve unit is configured to control opening and closing of the cooling passage and the bypass passage. The valve unit includes a valve and a control unit. The valve is configured to control opening of the cooling passage and the bypass passage on an inlet side or on an outlet side. The control unit is configured to drive the valve. The valve is configured to open the bypass passage to forcedly supply at least a part of intake air, which is drawn into the case, through the storage unit and the bypass passage into the intake port.

BRIEF DESCRIPTION OF THE DRAWINGS

The above and other objects, features and advantages of the present invention will become more apparent from the following detailed description made with reference to the accompanying drawings. In the drawings:

FIG. 3 is a schematic sectional view showing the air intake apparatus according to a second embodiment of the present disclosure; and FIG. 4 is a schematic sectional view showing an air intake apparatus for an internal combustion engine according to an exemplified embodiment.

DETAILED DESCRIPTION

As follows, embodiments of the present disclosure will be described in detail with reference to drawings.

(Embodiment)

In the embodiments, an air intake apparatus for an internal combustion engine according to the present disclosure is equipped to an engine system for an automobile. In the following examples, the air intake apparatus is equipped to a system employing a four-cylinder gasoline engine.

In the following description, an overall configuration of the engine system will be described. Subsequently, a feature of the air intake apparatus according to the present disclosure and a fundamental function of the present disclosure will be described. Subsequently, operation effects of the present disclosure will be described.

(First Embodiment)
(Fundamental Configuration)

Figure 1:
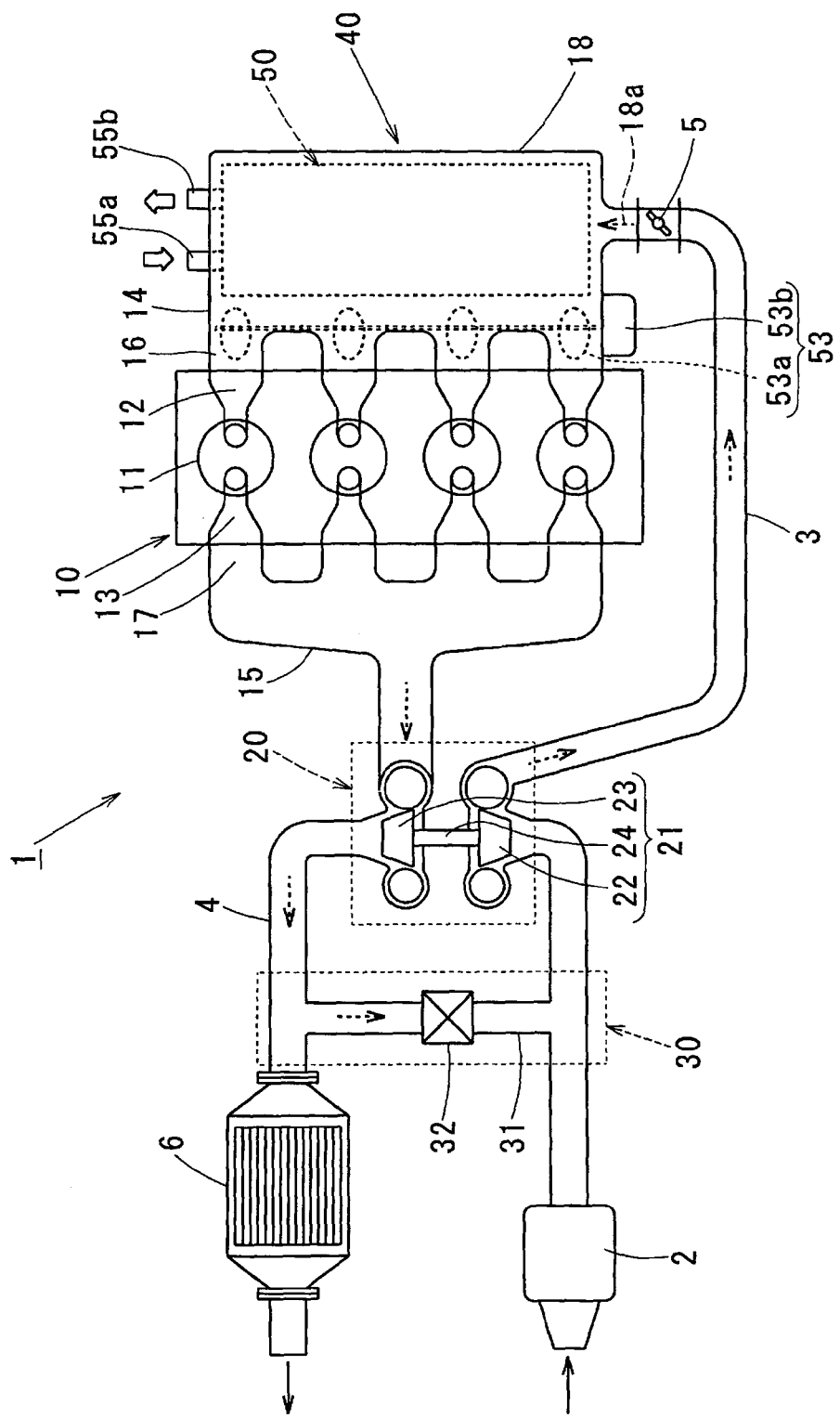
FIG. 1 is a schematic view showing an engine system equipped with an air intake apparatus according to a first embodiment of the present disclosure.

As shown in FIG. 1, an engine system 1 includes a supercharger system 20, an EGR system 30, and an air intake apparatus 40 for an engine 10. The air intake apparatus 40 includes an intercooler 50 for cooling supercharged intake air. The intercooler 50 is arranged vertically to the air intake apparatus 40.

The supercharger system 20 is configured to utilizes pressure of exhaust gas to supercharge intake air, which passed the air cleaner 2. The EGR system 30 has a function to return a part of exhaust gas as EGR gas into an intake air side.

The supercharger system 20 and the EGR system 30 may employ a general configuration, and therefore, detailed description thereof may be omitted in the following present embodiment.

In the present embodiment, the engine 10 is a four-cylinder engine including four cylinders 11. Each of the cylinders 11 includes an intake port 12 and an exhaust port 13. Four intake ports 12 are collected into an intake air manifold 14. Four exhaust ports 13 are collected into an exhaust manifold 15. Therefore, the intake air manifold 14 is equipped with four branch pipes (branch passages) 16 correspondingly to the four intake ports 12. In addition, the exhaust manifold 15 is equipped with four branch pipes (branch passages) 17 correspondingly to the four exhaust ports 13.

The intake air manifold 14 and the exhaust manifold 15 are connected to an intake passage 3 and an exhaust passage 4, respectively.

The supercharger system 20 includes a turbocharger 21 as a main component. The turbocharger 21 is located over the intake passage 3 and the exhaust passage 4.

The turbocharger 21 includes a compressor 22, a turbine 23, and a shaft 24. The shaft 24 connects the compressor 22 with the turbine 23. The compressor 22 is equipped in the intake passage 3 and is located between the air cleaner 2 and the throttle valve 5. Turbine 23 is equipped in the exhaust passage 4 and is located between the exhaust manifold 15 and an exhaust gas purification device 6. The turbine 23 is rotated by exhaust gas, which flows through the exhaust passage 4, thereby to drive the compressor 22. In this way, the compressor 22 compresses (supercharges) intake air, which flows through the intake passage 3, to supply the compressed air as supercharged intake air through the intake air manifold 14 into the engine 10.

The supercharged intake air is added with EGR gas, which is returned by the EGR system 30 into the intake air side. In the following description, supercharged intake air added with EGR gas may be denoted as supercharged intake air simply, unless an EGR function is specifically described.

The EGR system 30 is located over the intake passage 3 and the exhaust passage 4. In the present embodiment, the EGR system 30 employs a low-pressure loop EGR (LPL-EGR) to have an EGR-gas introduction passage 31. The EGR-gas introduction passage 31 connects an outlet of the turbine 23 in the exhaust passage 4 with an inlet of the turbocharger 21 in the intake passage 3. The EGR-gas introduction passage 31 is equipped with an EGR valve 32, which controls a quantity of EGR gas amount (EGR-gas quantity) to be returned.

In the present embodiment, the intercooler 50 (described later) is also used to cool EGR gas. Therefore, an EGR cooler, which is exclusive to cool EGR gas, is omitted.

The intake air manifold 14 forms a part of the air intake apparatus 40. The intake air manifold 14 includes a surge tank 18, which distributes intake air into the four branch pipes 16. The surge tank 18 is connected to the downstream side of a throttle valve 5. The throttle valve 5 is located on an outlet side of the turbocharger 21 in the intake passage 3. In the present configuration, the turbocharger 21 supercharges intake air, and the supercharged intake air flows once from an intake air feed port 18a of the intake air manifold 14 (surge tank 18) into the surge tank 18. The surge tank 18 reduces pressure fluctuation in the supercharged intake air. Thus, the supercharged intake air is distributed through the branch pipes 16 and flows into the intake ports 12, respectively.

The intake air manifold 14 is in a rectangular box-like shape in overview and includes the surge tank 18. In the intake air manifold 14, the surge tank 18 may function as an intercooler case and is equipped with main components of the intercooler 50.

(Fundamental Configuration of Intercooler)

Figure 2:
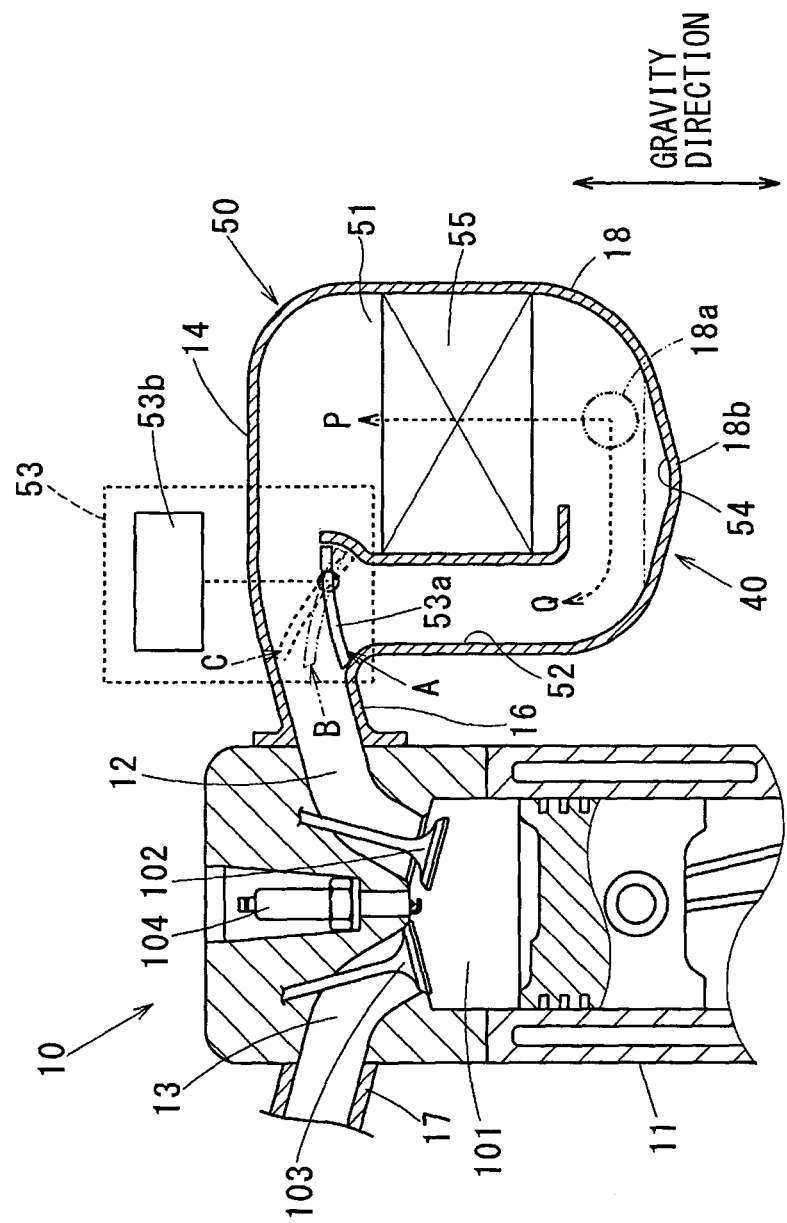
FIG. 2 is a schematic sectional view showing the air intake apparatus according to the first embodiment of the present disclosure.

As shown in FIG. 2, the intercooler 50 includes the surge tank 18 (intercooler case) of the intake air manifold 14, a cooling passage 51, a bypass passage 52, a valve unit 53, and a storage unit 54. The cooling passage 51 and the bypass passage 52 are partitioned from each other in the surge tank 18 to enable intake air flowing from the intake air feed port 18a into two ways as shown by arrows P and Q. The valve unit 53 opens and closes the cooling passage 51 and the bypass passage 52. The storage unit 54 is formed in a bottom portion 18b of the surge tank 18. The storage unit 54 accumulates liquid such as condensate occurred in or induced into the surge tank 18.

The interior of the surge tank 18 is partitioned along a longitudinal direction in FIG. 1 into two chambers including the cooling passage 51 and the bypass passage 52. The cooling passage 51 forms a large chamber, and the bypass passage 52 forms a small chamber.

(Feature of Intercooler)

The cooling passage 51, which forms the large chamber, is directed along the gravity direction (vertical direction). As shown by an arrow P, The cooling passage 51 enables supercharged intake air to flow upward from its bottom, while cooling the supercharged intake air therethrough. The cooling passage 51 is equipped with a water-cooling cooler 55.

The water-cooling cooler 55 is, for example, a general heat exchanger (cooler) including a laminated core formed of multiple tubes and fins interposed between the tubes. The water-cooling cooler 55 is constructed such that cooling water flows from an inlet pipe 55a (FIG. 1) to circulate through all the tubes and to return from an outlet pipe 55b (FIG. 1) subsequently. The circulation of the cooling water functions to cool intake air, which passes through the laminated core, and to cool intake air, which is in contact with the laminated core.

Each tube may be a flat pipe. Each fin may be a wave-like metallic thin plate (corrugate fin). It is noted that, each tube may be a circular pipe, and each fin may be a flat metallic thin plate (plate fin).

Cooling water of the water-cooling cooler 55 may be exclusive use. Alternatively, cooling water of the engine 10 may be utilizable as cooling water for the water-cooling cooler 55 by, for example, connecting the inlet pipe 55a and the outlet pipe 55b with the cooling water circulation path of the engine 10.

As shown by an arrow Q, the bypass passage 52, which forms the small chamber, circulates intake air to bypass the cooling passage 51. The bypass passage 52 is directed in parallel with the cooling passage 51 and is directed along the gravity direction (vertical direction).

Both the cooling passage 51 and the bypass passage 52 communicate with each other at the inlet side and at the outlet. The cooling passage 51 and the bypass passage 52 communicate with the branch pipe (branch passage) 16 at the outlet.

The valve unit 53 is equipped to the outlet of both the passages 51 and 52. The valve unit 53 opens and closes the cooling passage 51 and the bypass passage 52 to control communication among the passages 51 and 52 and the branch pipe 16.

The valve unit 53 includes valve elements 53a and a control unit 53b. Each of the valve elements 53a is in a swinging-plate shape and is rotatable. The control unit 53b drives the valve element 53a to control a rotational position of the valve element 53a.

The valve element 53a functions as a main valve to control an opening (opening quantity) of the cooling passage 51 and an opening (opening quantity) of the bypass passage 52. The valve element 53a functions as a common valve element located over both the outlets of the cooling passage 51 and the bypass passage 52. The valve element 53a controls opening of the outlet of each of the cooling passage 51 and the bypass passage 52.

The valve element 53a having the swinging plate shape configuration is driven by the control unit 53b to rotate at three swing positions including a solid line position A, an imaginary line position B, and a dashed line position C. At the solid line position A, the valve element 53a completely blocks (fully closes) the bypass passage 52. In addition, the valve element 53a completely releases (fully opens) the cooling passage 51. At the imaginary line position B, the valve element 53a renders both the cooling passage 51 and the bypass passage 52 in an intermediate opening state. At the dashed line position C, the valve element 53a completely releases (fully opens) the bypass passage 52. In addition, the valve element 53a completely blocks (fully closes) the cooling passage 51.

Therefore, the valve element 53a moves to the solid line position A thereby to communicate only the cooling passage 51 with the branch pipe 16. The valve element 53a moves to the dashed line position C thereby to communicate only the bypass passage 52 with the branch pipe 16. The valve element 53a moves to the imaginary line position B thereby to communicate both the cooling passage 51 and the bypass passage 52 with the branch pipe 16.

The valve element 53a being in the swinging plate shape may have a single sheet configuration including a single plate extending in a longitudinal direction. Alternatively, the valve element 53a may have a divided configuration including two or more plates corresponding to the number of the branch pipes 16. In this case, the two or more plates may be connected in series. The former single sheet configuration may be employed in the cooling passage 51 and the bypass passage 52 each having a single opening at the outlet. The latter divided configuration may be employed in the cooling passage 51 and the bypass passage 52 each having openings at the outlet divided correspondingly to the number of the branch pipes 16.

The storage unit 54 is located at the lowermost position in the intercooler 50 relative to the gravity direction. The bypass passage 52 opens at the inlet side in the storage unit 54. In the present configuration, intake air flows through the storage unit 54, the bypass passage 52, and the branch pipe 16, and lows into the intake port 12.

In FIG. 2, the engine 10 has a cylinder 11 each having a combustion chamber 101 and each equipped with an intake valve 102, an exhaust valve 103, and an ignition plug 104.

Subsequently, a fundamental function of the air intake apparatus 40 according to the present disclosure will be described.

When the engine 10 is in operation, the supercharger system 20 is activated to cause the turbocharger 21 to supercharge intake air and to draw the supercharged intake air from the intake passage 3 into the surge tank 18 of the intake air manifold 14. Thus, the drawn intake air is cooled with the water-cooling cooler 55 of the intercooler 50.

While the water-cooling cooler 55 cools intake air, condensate occurs. In addition, liquid, such as oil of the compressor 22, also occurs. The condensate and the liquid flow into the surge tank 18 with intake air and accumulate in the storage unit 54 formed at the bottom portion 18b of the surge tank 18. In particular, when the EGR system 30 is active, EGR gas at a high temperature is added to intake air. Therefore, in this case, a large amount of condensate occurs. Consequently, the storage unit 54 is prone to accumulate a large amount of liquid.

Therefore, processing of the liquid may be concerned. For example, as shown in FIG. 4, assuming a state where all the supercharged intake air is drawn simply to pass through the intercooler 50, a large amount of liquid, such as condensate, may accumulate in the bottom portion 18b (storage unit 54) of the surge tank 18. In this case, in a case where an amount of intake air increases rapidly due to acceleration of the vehicle, as shown by an arrow X, the accumulating liquid may flow from the intake port 12 into the combustion chamber 101 together with intake air. Consequently, relatively serious phenomena such as water hammer may be concerned.

To the contrary, as described below, the present configuration according to the present disclosure enables to address the processing of liquid. Specifically, the configuration enables appropriately to discharge liquid such as condensate and oil accumulating in the intercooler 50 according to the operation state of the engine 10.

Specifically, in a normal operational region (normal usage state) of the engine 10, the valve element 53a of the valve unit 53 is set at the solid line position A. In this way, the valve element 53a is set to completely block (fully closes) the bypass passage 52. In addition, the valve element 53a is set to completely release (fully opens) the cooling passage 51. In the present configuration, the intercooler 50 selectively causes the cooling passage 51 to function effectively. Therefore, supercharged intake air flowing into the surge tank 18 of the intake air manifold 14 entirely passes selectively (only) the cooling passage 51. Thus, the supercharged intake air is drawn into the intake port 12.

Therefore, all the supercharged intake air drawn into the intake port 12 can be appropriately cooled with the water-cooling cooler 55 and can be supplied into each cylinder 11 of the engine 10. Therefore, engine performance can be suitably securable.

Subsequently, not to accumulate liquid in the storage unit 54 more than a predetermined quantity, the valve element 53a of the valve unit 53 is set at the dashed line position C in order to purge the liquid. In this way, the valve element 53a completely blocks (fully closes) the cooling passage 51. In addition, the valve element 53a completely releases (fully opens) the bypass passage 52. In this way, all the supercharged intake air bypasses the cooling passage 51 to pass through the bypass passage 52.

The present configuration restricts further occurrence of condensate. In addition, supercharged intake air flows into the bypass passage 52 without passing through the storage unit 54. Therefore, the supercharged intake air flowing at high velocity entrains the liquid accumulating in the storage unit 54 thereby to flow together into the combustion chamber 101.

In this way, liquid can be restricted from accumulating in the storage unit 54 more than a predetermined amount. In addition, the liquid in the storage unit 54 is purged arbitrarily thereby to regulate the amount of liquid to be purged within an appropriate amount. Therefore, drawing liquid into the combustion chamber 101 may not spoil engine performance.

In an operation in which condensate is expected to occur in the intercooler 50 more than the predetermined amount, the valve element 53a of the valve unit 53 is set at the imaginary line position B. In this way, the valve element 53a renders both the cooling passage 51 and the bypass passage 52 in the intermediate opening state, thereby to communicate both the cooling passage 51 and the bypass passage 52 with the branch pipe 16.

In this way, a part of supercharged intake air is forcedly bypassed, thereby to reduce an amount of intake air passing through the cooling passage 51 and to reduce an amount of condensate occurring through the water-cooling cooler 55 of the intercooler 50.

In this way, an amount of condensate can be controlled without reduction in an amount of EGR gas drawn into the supercharged intake air. Therefore, fuel consumption can be reduced desirably.

(Second Embodiment)

Subsequently, a second embodiment of the present disclosure will be described with reference to FIG. 3.

In the air intake apparatus 40 according to the second embodiment, the valve unit 53 is enabled to function as a tumble control valve unit.

According to the present embodiment, the valve unit 53 further includes an auxiliary valve 53c in addition to the valve element 53a. The auxiliary valve 53c opens and closes selectively (only) the bypass passage 52. The valve element 53a is in the swinging plate shape and functions as a main valve.

The auxiliary valve 53c is controlled with the control unit 53b at two positions including a solid line position (normally close position) and a dashed line position (full-open position). In the solid line position, the auxiliary valve 53c blocks the bypass passage 52 completely. In the dashed line position, the auxiliary valve 53c releases (opens) the bypass passage 52 completely.

Similarly to the first embodiment, the valve element 53a, which is the main valve, is located over both the cooling passage 51 and the bypass passage 52 at the outlet. In addition, the valve element 53a is driven by the control unit 53b at the three swing positions including the solid line position A, the imaginary line position B, and the dashed line position C.

It is noted that, according to the present embodiment, the intermediate position (imaginary line position B) of the valve element 53a, which is the main valve, is controlled arbitrarily in cooperation with the auxiliary valve 53c. In this way, the present embodiment has a variable intake air flow characteristic.

Operation of the air intake apparatus 40 according to the present embodiment will be described as follows.

First, the auxiliary valve 53c is set at the dashed line position (normally open position) b to normally open the bypass passage 52. In this case, the swinging plate shape valve element 53a, which is the main valve, may be set at one of the three positions including the solid line position A, the imaginary line position B, and the dashed line position C. In this way, the present embodiment is enabled to produce the operation effect substantially same as that in the first embodiment.

The auxiliary valve 53c is set at the solid line position (full-close position) a to block the bypass passage 52 completely. In the case, when, for example, the valve element 53a is set at the imaginary line position (intermediate position) B, as shown by an arrow P, supercharged intake air passes selectively through (only) the cooling passage 51. Presently, the cooling passage 51 is intermediately opening to communicate an upper intermediate passage therethrough. Therefore, the supercharged intake air flows through the upper intermediate passage of the cooling passage 51 to cause an intake air flow (deflection flow). In this case, the upper intermediate passage of the cooling passage 51 throttles the cross-sectional area of the passage thereby to cause supercharged intake air to flow out at a high-velocity flow. Thus, the upper intermediate passage generates an intensified flow.

Therefore, the flow of intake air supplied into the intake port 12 is deflected to become the intensified flow. Thus, as shown by a solid line arrow Y, the intensified flow is directed into the combustion chamber 101 with sufficient momentum, thereby to facilitate to generate a desired whirlpool (tumble flow) in the combustion chamber 101. In this way, the present configuration effectively accelerates mixture of the supplied intake air with fuel, which is injected from a fuel injection valve (not shown), in the combustion chamber 101. Thus, the present configuration generates an air-fuel mixture at a suitable air/fuel ratio around the ignition plug 104, thereby to promote ignition and combustion of the mixture. Consequently, the present configuration enables to improve combustion in the engine.

In the present state, while the bypass passage 52 is completely blocked, the intermediate position (imaginary line position B9) of the valve element 53a in the swinging plate shape may be adjusted at an arbitrary position in the swinging range between the solid line position A and the dashed line position C. In this way, the opening of the outlet of the cooling passage 51 may be controlled, thereby to variably control the flow of supercharged intake air supplied into the multiple intake ports 12. Specifically, the characteristic of intake air flow such as the deflection and the flow velocity can be variably adjusted. With the present configuration, the valve unit 53 may also function as the tumble control valve unit, thereby to enable to reduce emission in cold starting of the engine and to increase in the EGR amount further to reduce fuel consumption.

(Modification)

Two embodiments of the air intake apparatus according to the present disclosure have been described. As follows, modifications of the air intake apparatus will be described.

(1) In the above-described embodiments, the air intake apparatus is applied to the engine system 1 employing the 4-cylinder gasoline engine as the engine 10. It is noted that, the air intake apparatus may be applied to a diesel engine. The number of the cylinders of the engine 10 is not limited to those in the above-described embodiments, and the configuration of the air intake apparatus 40 may be arbitrary modified according to the number of cylinders of the engine.

(2) In the embodiment, in order to form the intercooler 50 in the intake air manifold 14, the surge tank 18 of the intake air manifold 14 is utilized as a case of the intercooler 50. It is noted that, the intake air manifold 14 may be separately provided from the surge tank 18.

(3) In the above-described embodiments, the LPL-EGR is employed as the EGR system 30. It is noted that, a high-pressure loop EGR (HPL-EGR) may be employed as the EGR system 30. In the HPL-EGR, exhaust gas may be taken at from the exhaust passage 4 on the upstream of the turbine 23, and EGR may be returned to the intake passage 3 on the downstream of the compressor 22. It is further noted that, both the LPL-EGR and the HPL-EGR may be combined.

It is further noted that, the configuration according to the present disclosure may be employed in an engine system including an EGR cooler equipped to the LPL-EGR and/or the HPL-EGR for EGR-gas cooling or in an engine system, which does not employ the EGR system 30. Even in these cases, the configuration according to the present disclosure may address processing of liquid.

(4) According to the second embodiment, the valve unit 53 (valve element 53a) is utilized as the tumble control valve unit, and therefore, the valve unit 53 may be located at the outlet of the cooling passage 51 and the bypass passage 52. It is noted that, according to the first embodiment, the location of the valve unit 53 is not limited, and therefore, the valve element 53a may be located, for example, over the inlet side of both the cooling passage 51 and the bypass passage 52. In this case, similar operation effect can be produced.

(5) In the above-described embodiments, the valve element 53a is in the swinging plate shape employed as the main valve of the valve unit 53. The valve element 53a may have another configuration. For example, the valve element 53a may be in a rotational dome shape. Even in this case, the valve element 53a may function as a common valve element located over the outlet of the cooling passage 51 and the bypass passage 52. Thus, the valve element 53a is enabled to control reciprocally the opening of the outlet of the both the cooling passage 51 and the bypass passage 52.

(6) In the above-described embodiments, the control unit 53b of the valve unit 53 includes the actuator device and the control device. The actuator device controls the swinging movement of the valve element 53a. The control device controls electricity supply to the actuator device according to the operation state of the engine 10. The actuator device may employ a general actuator, such as a motor and/or a solenoid activated with electricity supply. The control device may be an engine controller unit equipped to control the operation state of the engine 10. In this case, the engine controller may be equipped with functions needed for the control device.

As follows, examples of features and the operation effects of the present disclosure will be summarized.

(1) The valve unit 53 is equipped as a valve device at the outlet of the cooling passage 51 and the bypass passage 52. The valve unit 53 includes the main valve (valve element 53a), which controls the opening of the cooling passage 51 and the bypass passage 52.

According to the present configuration, dropping of condensate onto the main valve (valve element 53a) need not be considered, compared with the equipment of the main valve (valve element 53a) at the inlet side of the cooling passage 51 and the bypass passage 52.

(2) The valve unit 53 may include the auxiliary valve 53c in addition to the main valve (valve element 53a). The auxiliary valve 53c opens and closes selectively (only) the bypass passage 52. In this case, the main valve (valve element 53a) may control opening of the outlet side of the cooling passage 51, in the state where the auxiliary valve 53c blocks the bypass passage 52. In this way, the main valve (valve element 53a) may deflect the flow of intake air supplied into the multiple intake ports 12.

With the present configuration, the valve unit 53 can be utilized also as the tumble control valve unit.

(3) The main valve (valve element 53a) may include a common valve element 53a located over the outlet side of the cooling passage 51 and the bypass passage 52. The valve element 53a may control the opening of the outlet side of both the cooling passage 51 and the bypass passage 52 in contradiction to each other. That is, the valve element 53a may increase the opening of the outlet side of the cooling passage 51 while decreasing the opening of the outlet side of the bypass passage 52, and vice versa.

According to this configuration, the single valve element 53 is enabled to control the opening of the outlet side of both the cooling passage 51 and the bypass passage 52. Thus, the apparatus can be downsized and cost-reduced.

(4) The air intake apparatus 40 includes the EGR system 30 to draw a part of exhaust gas as EGR gas into at least one of the inlet side of the turbocharger 21 and the outlet side of the turbocharger 21.

The EGR system 30 is enabled to address liquid, such as condensate, to supercharged intake air including EGR gas.

As described above, the air intake apparatus is configured to cause the intercooler to cool intake air, which is supercharged with the turbocharger, and to distribute the intake air into the multiple intake ports of the internal combustion engine. The intercooler includes the case, the cooling passage, the bypass passage, the valve unit, and the storage unit. The case is, for example, the surge tank connected between the outlet of the turbocharger and the multiple intake ports. The cooling passage and the bypass passage are partitioned in the case and configured to split intake air into two flows. The valve unit controls opening and closing of the cooling passage and the bypass passage. The storage unit is formed in the bottom portion of the case and configured to accumulate liquid such as condensate occurring in or drawn into the case.

The cooling passage is located along the gravity direction and configured to cool intake air while flowing the intake air from the lower side to the upper side. Liquid, such as condensate, can be accumulated in the bottom portion of the case.

Liquid may be accumulated in, for example, the surge tank. The bypass passage is configured to flow intake air to bypass the cooling passage.

The valve unit includes the valve and the control unit. The valve controls the opening of the cooling passage and the bypass passage on the inlet side or on the outlet side. The control unit drives the valve. The valve is configured to release the bypass passage to forcedly supply at least a part of intake air, which is drawn into the case, through the storage unit and the bypass passage into the intake ports.

According to the configuration, the intercooler is located (arranged) vertically thereby to direct the cooling passage along the gravity direction. The configuration enables to flow intake air from the lower side to the upper side while cooling therethrough. In addition, the configuration enables to accumulate liquid such as condensate in the bottom portion of the case. Therefore, the configuration has less regulation in mountability. In addition, the intercooler can be utilized as the EGR cooler. Thus, the total system can be downsized.

In a normal driving operation, the bypass passage is blockaded completely (fully closed), and the cooling passage is released completely (fully opened). In this way, regardless of that intake air contains EGR gas or not, all the supercharged intake air (whole quantity) passes selectively (only) through the cooling passage, and the intake air is drawn into the intake ports. Therefore, supercharged intake air can be cooled appropriately, and excellent engine performance is securable.

In addition, in a driving operation, in which an amount of condensate occurring in the intercooler is supposed to be beyond a predetermined value, supercharged intake air is divided into both the cooling passage and the bypass passage. Therefore, a part of supercharged intake air is restricted from passing through the cooling passage. Therefore, an amount of condensate can be controlled, without reduction in an amount of EGR. Therefore, fuel consumption can be reduced desirably.

Furthermore, the cooling passage is blocked completely (fully closed), and the bypass passage is released completely (fully opened), thereby to flow all supercharged intake air through the storage unit and the bypass passage. In this way, liquid accumulating in the storage unit can be purged arbitrarily. Therefore, an appropriate amount of liquid selectively flows into the engine combustion chamber. Thus, engine performance can be secured.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An air intake apparatus configured to receive intake air, which is supercharged with a turbocharger, and to distribute the intake air into a plurality of intake ports of an internal combustion engine, the air intake apparatus comprising:
    an intercooler configured to cool intake air supercharged with the turbocharger, wherein
    the intercooler includes a case and a valve unit,
    the case is connected between an outlet of the turbocharger and the intake ports,
    the case has a cooling passage and a bypass passage, which are partitioned from each other and configured to split intake air into two flows,
    the cooling passage is configured to flow intake air from a lower side to an upper side, while cooling the intake air passing through a water-cooling cooler in a gravity direction,
    the bypass passage is configured to cause intake air to bypass the cooling passage,
    the case has a bottom portion forming a storage unit configured to accumulate liquid occurring in or drawn into the case,
    the valve unit is configured to control opening and closing of the cooling passage and the bypass passage,
    the valve unit includes a valve and a control unit,
    the valve is configured to control opening of the cooling passage and the bypass passage on an inlet side or on an outlet side,
    the control unit is configured to drive the valve, and
    the valve is configured to open the bypass passage to forcedly supply at least a part of intake air, which is drawn into the case, through the storage unit and the bypass passage into the intake port.

2. The air intake apparatus according to claim 1, wherein the valve includes a main valve located on the outlet side of the cooling passage and the bypass passage and configured to control the opening of the cooling passage and the bypass passage.

3. The air intake apparatus according to claim 2, wherein
    the valve further includes an auxiliary valve configured to open and close the bypass passage, and
    the main valve is configured to control opening of the outlet side of the cooling passage to deflect a flow of intake air supplied into the intake ports, in a state where the auxiliary valve blocks the bypass passage.

4. The air intake apparatus according to claim 2, wherein
    the main valve includes a valve element located commonly over the outlet side of the cooling passage and the bypass passage, and
    the valve element is configured to control an opening of both the cooling passage and the bypass passage on the outlet side.

5. The air intake apparatus according to claim 1, further comprising:
    an EGR system located on at least one of an inlet side and an outlet side of the turbocharger, wherein
    the EGR system configured to draw a part of exhaust gas as EGR gas.

6. The air intake apparatus according to claim 1, wherein the intake air entrains the liquid accumulating in the storage unit to flow together into a combustion chamber through the intake port when the valve opens the bypass passage.

7. The air intake apparatus according to claim 1, wherein the water-cooling cooler includes a laminated core formed of multiple tubes extending along the gravity direction and fins interposed between the tubes.

8. The air intake apparatus according to claim 1, wherein the bypass passage is directed in parallel with the cooling passage.

* * * * *